May 7, 1929.  L. KAMBO  1,711,791
ODOGRAPH
Filed May 5, 1927  2 Sheets-Sheet 1

Inventor
Luigi Kambo
By
Attorney

May 7, 1929.  L. KAMBO  1,711,791
ODOGRAPH
Filed May 5, 1927  2 Sheets-Sheet 2
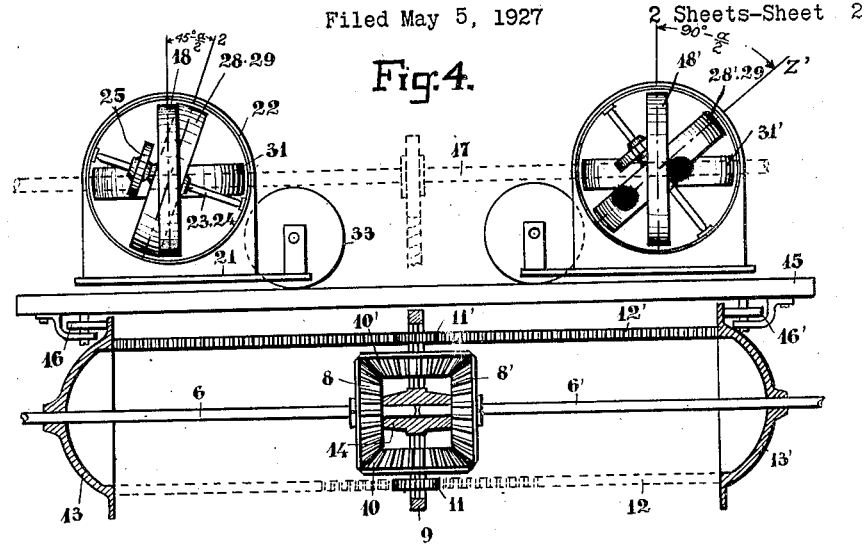
Fig. 4.
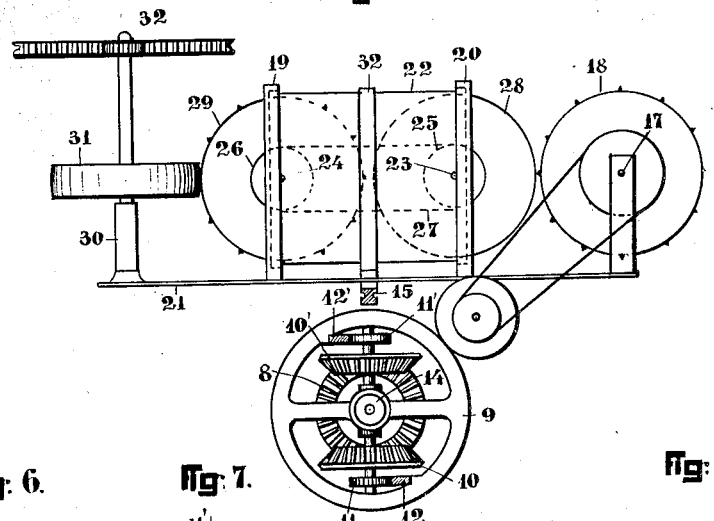
Fig. 5.
Fig. 6.  Fig. 7.  Fig. 8.
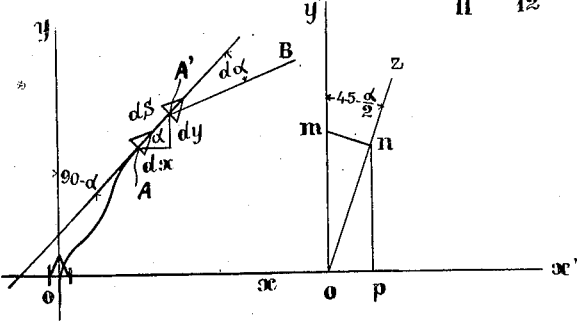
Inventor
Luigi Kambo
By
Attorney Patented May 7, 1929.

1,711,791

UNITED STATES PATENT OFFICE.

LUIGI KAMBO, OF ROME, ITALY.

ODOGRAPH.

Application filed May 5, 1927, Serial No. 189,000, and in Italy May 10, 1926.

The object of the invention is an odograph that is a device intended to trace automatically, at a given scale, the course followed by any vehicle travelling on land, at sea, or in the air.

In the annexed drawing:

Figures 4 and 5 are two views of the differential gear and speed changing device of the odograph;

Figures 6 and 7 are geometric diagrams; and

Figure 8 shows the drawing sheet upon which the course followed by the vehicle is recorded.

Figure 1:
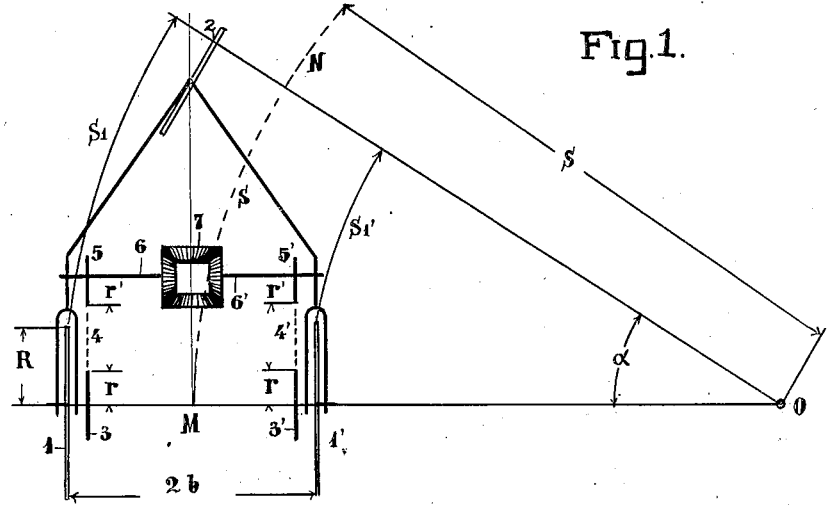
Figures 1, 2 and 3 show respectively a diagrammatic view, a top view and a side elevation of a tricycle provided with a device according to the invention.
Figure 2:
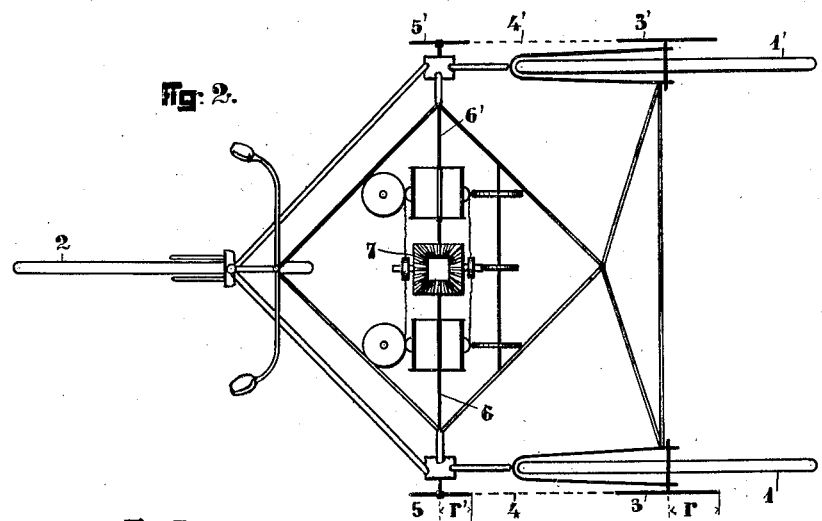
Figure 3:
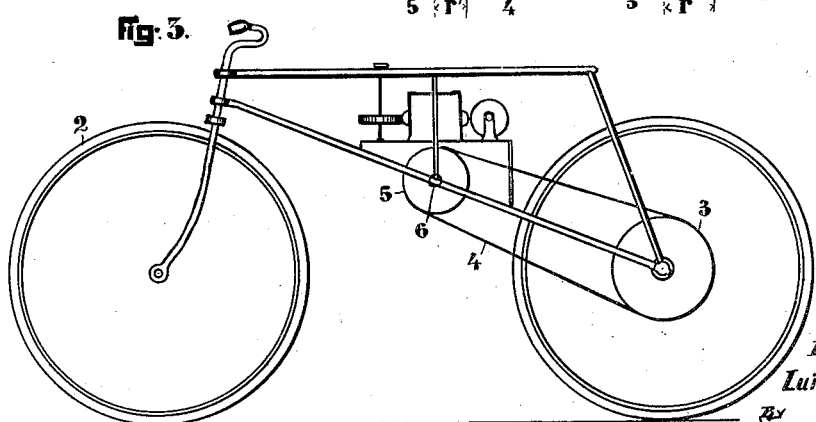

Figures 1, 2 and 3 show a vehicle, for instance a tricycle whose wheels are 1, 1' and 2; the distance between the centers of the wheels 1 and 1' is $2^b$ and their radius $R$; the wheels 1 and 1' are parallel and mounted loose on their axle spindles, they are connected with the two chain-wheels 3.3' whose radius is $r$; these chain-wheels drive by means of the two chains 4.4' the two chain-wheels 5.5' whose radius is $r'$, it being $$\frac{r'}{r}=k$$

When the vehicle follows a circular path MN with the center at O and whose developed length is S (Fig. 1), whose radius is $\rho$ and which extends for an angle $\alpha$, we then have the relation $$MN=S=\rho\alpha$$

If $S_1$ is the length of the arc described by the outer wheel and $S_2$, the length of the arc described by the inner wheel, the relation is evidently (1) $\begin{aligned} S_1 &= (\rho+b)\alpha \\ S_1 &= (\rho-b)\alpha \end{aligned}$ If we call $\omega_1$, $\omega_2$, the angles of rotation of the wheels 1, 1' their axles when the vehicle will have completed the arc MN, we shall have also (2) $\begin{aligned} S_1 &= R\omega_1 \\ S_2 &= R\omega_2 \end{aligned}$ and calling $\omega_5$, $\omega_6$, the corresponding rotations of the wheels 5, 5' we shall have (3) $\begin{aligned} \omega_1 &= k\omega_5 \\ \omega_2 &= k\omega_6 \end{aligned}$ The wheels 5,5' are keyed upon the ends of a divided axle 6,6' which carries at its center a complete differential gear 7 whose satellite pinion 8,8' (Fig. 4,5) rotate respectively like the wheels 5,5'.

If we call $\Omega$ the revolution of the satellites' crown 9 around the axle 6,6' and $\varphi$ the rotation of the satellites 10,10 around their own axle, we shall have for the property of the differential gear (4) $\Omega = \dfrac{\omega_5 + \omega_6}{2}$ (5) $\varphi = \dfrac{\omega_5 - \omega_6}{2}$ By substituting the values given by the equations (2) and (3) we shall have (6) $\Omega = \dfrac{S_1 + S_2}{2RK}$ (7) $\varphi = \dfrac{S_1 - S_2}{2RK}$ But from the (1) we have (8) $\dfrac{S_1 + S_2}{2} = \rho\alpha = S$ (9) $\dfrac{S_1 - S_2}{2} = b\alpha$ and finally

(10) $\Omega = \dfrac{S}{RK}$     (11) $\varphi = \dfrac{b}{RK}$ $R$, $K$, $b$, being known constants we shall have that:

(a) the revolution Ω of the satellites' crown is proportional to the circular arc followed by the vehicle.

(b) the rotation $\varphi$ of the satellites is proportional to the central angle of the circular arc followed by the vehicle.

This is true only for finite circular arcs but since we can consider any curve as formed by a succession of infinitesimal circular arcs, we shall have for each of these $$dQ = \frac{dS}{RK} \qquad d\varphi = \frac{bd}{RK}$$

In these formulas the variable radius has disappeared and they can be integrated, thus obtaining again the formulas (10) (11) and therefore, whatever be the shape of the trajectory, the revolution will be proportional to the length of the route followed by the vehicle, and the rotation will be proportional to the angular deviation of the axis of the vehicle from its initial direction, since these deviation are equal to the sum of the central angles of the infinitesimal arcs.

Therefore the differential records the two magnitudes Ω and $\varphi$ which individuate the movement of the vehicle namely the length S of the space covered and the deviation $\alpha$ from the initial direction.

It is necessary now to separate the rotation $\varphi$ from the revolution Ω which are amalgamated in the movement of the satellites.

Connected with the satellites 10,10' are two small gears 11,11' which naturally rotate by the same angle $\varphi$; they mesh with the two racks 12,12' which connect the two dome-shaped pieces 13,13'; these can run smoothly along the shaft 6,6'. The conical pinions 10,10' and the small gears 11,11' turn around axles supported by the hub 14, which connects the two extremities of the divided axle 6,6', and by the satellites' crown 9.

While the wheels 11,11' rotate by the same angle $\varphi$, the racks 12,12' move accordingly away. driving the carriage 13,13' to the right or to the left according as the center of the curve followed by the vehicle is to the right or to the left of its path.

Above the carriage 13,13' is provided a rack bar 15 having teeth in its upper face and which moves in a straight line; and bears at both its ends two rollers 16,16' which transfer to the bar 15, the carriage translation which is proportional to the angle $\alpha$.

Summing up, the bar 15 will move off in proportion to the angles $\alpha$ and the satellites' crown 9 will rotate by the angle Ω which is proportional to length S of the path covered. Thus the two elements of the movement of the vehicle have been separated.

The crown 9 by means of a transmission (a chain, for instance), communicates its movement to the axle 17 which carries the two sprocket wheels 18,18' provided with projecting pins; it is evident that these two wheels move with a speed proportional to that of the satellites' crown and consequently to that of the vehicle.

The problem is now to separate and to take the two components of the speed of the vehicle along the two coordinate axes $x, y$, fixed in respect of the ground (Fig. 6), to which is referred the course of the vehicle; this result may be obtained by means of the gradual speed changing device (Figs. 4–5).

Two circular supports 19,20, secured to a platform 21, carry a hollow cylinder 22, which can rotate, smoothly sliding around its geometrical axis. Said cylinder carries in its turn two parallel axles 23,24 both perpendicular to the axis of the cylinder, and connected together by means of two small gears 25,26 and a little chain 27 or by means of any other convenient system of transmission.

On the two axles 23,24 are also keyed two wheels 28,29 whose middle planes are coincident. The wheel 28 has its peripheric surface closely corrugated, the grooves being parallel to the axle 23; the wheel 29 is indentical with the wheel 18. A standard 30 fixed to the platform 21 supports the horizontal wheel 31 which is identical to the wheel 28. Thus in each speed changing device there are provided two grooved wheels 28, 31 and two wheels 18, 29 supplied with projecting pins.

The cylinder and consequently the plane of the axles 23,24 is set in motion by the geared crown wheel 32 applied in the middle to its periphery.

As pointed out above the rack 15 moves in proportion to the angle $\alpha$, and by means of the gear 33 fixed to the platform 21, causes the cylinder 22 to rotate in proportion to the angle $\alpha$. The constants of the instrument are chosen in such manner that when the vehicle deviates by the angle $90 - \alpha$ from the initial direction (which is assumed to be the axis $y$), the cylinder will deviate from the initial position (that is to be that for which the plane of the axles 23,24 is horizontal) by the angle $$45 - \frac{\alpha}{2}$$

(Figs. 6.4).

Therefore if the vehicle moves from A to A' (Fig. 6) following the straight line $dS$ which forms with the axis $x$ the angle $\alpha$, the middle plane of the two wheels 28,29 will form constantly with the vertical the angle $$45 - \frac{\alpha}{2}.$$

In the Fig. 7 the axis $y'$ represents the middle plane of the wheel 18, the axis $z$ represents the middle plane of the two wheels 28,29 and the axis $x'$ represents the middle plane of the wheel 31.

While the vehicle moves from A to A' the position of the axis $z$ remains unchanged, while the wheel 18 will rotate around the axle 17 in proportion to $dS$.

If on the axis $y'$ is reported the length—$om$—which is the peripheric movement of the wheel 18 while the vehicle moves from A to A', we will have $$om = \mu dS$$

the constant $\mu$ being the factor of proportionality.

In this displacement a pin of the wheel 18 entering in a groove of the wheel 28 parallel to the axis $z$, drags it along compelling it to turn around its axle; the peripheric displacement of the wheel 28 will be —$on$—, being —$on$— the projection of —$om$— on the axis $z'$. The displacement of the wheel 29 will be the same because the two wheels 28 and 29 are equal, parallel and mechanically connected.

One pin of the sprocket wheel 29 entering into a groove of the horizontal wheel 31 drags it along in the same way as the couple 18,28 and the displacement of the wheel 31 will be —$op$— the projection of —$on$— on the axis $x'$.

Therefore when the vehicle moves a distance $dS$, the wheel 29 will move only a distance —$op$—

$$(12) \quad on = om - \cos\left(45 - \frac{a}{2}\right)$$

$$(13) \quad op = on \sin\left(45 - \frac{a}{2}\right)$$

We will have $$(14) \quad op = om \cos\left(45 - \frac{a}{2}\right) \sin\left(45 - \frac{a}{2}\right) = \frac{om}{2} \sin 2\left(45 - \frac{a}{2}\right) = \frac{om}{2} \sin(90 - a) = \frac{om}{2} \cos a$$

But
$$om = \mu dS$$
and
$$dx = \cos a \, dS.$$
therefore
$$op = \frac{\mu}{2} dx$$

$\mu$ being constant and well known it follows that the rotation of the wheel 31 will be proportional to the displacement $dx$ of the vehicle.

The same happens for the second speed changing device, the only difference being that the angle with the vertical of middle plane of the wheels 28' 29' is $$90° - \frac{a}{2}$$

because these planes form constantly an angle of 45° with the middle plane of the wheels 28, 29.

We will have then ($om$ being equal)

$$op' = \frac{om}{2} \operatorname{sen} 2\left(90 - \frac{a}{2}\right) = \frac{om}{2} \operatorname{sen}(180 - a) = \frac{om}{2} \operatorname{sen} a$$

and consequently being $$om = \mu dS \quad dy = \operatorname{sen} a \, dS$$

we will have $$op' = \frac{\mu}{2} dy$$

Therefore when the vehicle moves from A to A' the wheel 31 moves in proportion of $dx$ and the wheel 31' moves in proportion of $dy$.

When the vehicle arrives in A' and takes the new direction A'B inclined to the precedent direction A A' by an angle $da$, we can consider that it rotates on the point A' without leaving its place; the cylinders 22,22' rotate of the same angle $\frac{da}{2}$ but as their axes pass through the point of contact between 18, 28 and 29, 31 of the first change of speed and through the points of contact between 18',28', 29',31 of the second speed changing device, the rotation of the cylinders does not produce any movement of the wheels 31 and 31', therefore the movement of the wheels 31,31' is only proportional to the displacement of the vehicle along the axes $x$ and $y$ respectively when it moves from A to A'.

On the axles of the wheels 31, 31' are keyed respectively the two gears 32,32' (Fig. 8) which move the two orthogonal racks 33,33'; the bar 33 will move in proportion of $dx$ and the bar 33' will move in proportion of $dy$.

The two racks reproduce on the drawing sheet the axes $x$ and $y$ of the ground; they carry two small bars of circular section 34,34', in the intersection of these is provided a pencil 35 which moves as the vehicle and marks at every moment in the drawing sheet the position of the vehicle on the ground.

The instrument will find numerous applications in the fields of topography, sports nautics, aereonautics and strategy, naturally if it is applied to a ship or to a dirigible it is necessary to substitute to the wheels 1, 1' rolling on the ground, two screws at sea or in the air. Many of the mechanical connections described can be substituted by electrical connections.

What I claim is:

1. In an odograph of the kind comprising a record sheet and a movable writing point designed to trace on said sheet the course followed by a vehicle, a transmission interposed between the writing point and two coaxial wheels of the vehicle which rotate independently the one from the other, by means of which transmission are imparted to the writing point two movements at a time in the directions of two orthogonal axes traced on the record sheet, each of said movements being proportional to the corresponding instantaneous displacement of the vehicle in respect of two fixed orthogonal axes intersecting in that point of the ground from which the vehicle has started for its travel.

2. In an odograph as specified in claim 1, a device for imparting the movement to the writing point, consisting in two sliding bars, which can be shifted in directions perpendicular to the directions of the fixed axes traced on the record sheet, a connection between said bars and two wheels of the vehicle controlling their movement, said connection including a differential gear and a speed changing device with gradually variable ratio of transmission, in such a manner that, when the vehicle moves along a curved path and the driving wheels perform a different number of rotations, thereby causing the differential gear to come into action, the said differential gear acts on the speed changing device in such a manner that the ratios of transmission between each bar and the corresponding wheel are automatically adjusted in proportion of the sines and cosines of the angle which the instantaneous direction of the vehicle forms with the initial direction.

3. In an odograph as specified in claim 1, a device for effecting the transformation of a rotation around an axis moving in a plane, and specifically the rotation of the shafts of the satellite pinions of a differential gear interposed between the driving wheels and the writing point, which shafts move in a plane perpendicular to the rear axle of the vehicle, in a rotation around a fixed axis.

4. In an odograph as specified in claim 1, with a differential gear between the driving wheels and the writing points, a device for transforming the rotation of the shafts of the satellite pinions of the differential gear, which takes place in a plane perpendicular to the rear axle of the vehicle, in a rotation around a fixed axis, consisting in a cage shiftable along the rear axle of the vehicle and comprising two end covers connected by means of cross rods, two racks meshing with gears mounted on the shafts of the satellite pinions of the differential gear, said cage being mounted rotatable around the rear axle, along which it can be shifted together with the system of satellite pinions, the two end covers sliding with their edges within two notches of a rack sliding in turn longitudinally in guiding pieces fixed to the body of the vehicle, which rack meshes with a gear, the axle of which is also fixed to the body of the vehicle.

5. In an odograph as specified in claim 1, with a differential gear between the driving wheels and the writing point, a speed changing device with variable transmission ratio interposed between the two half axles of the differential gear and the sliding bars which control the movement of the writing point, consisting of two cylindrical trunks mounted rotatably in seats fixed to the body of the vehicle and both controlled by a gear fixed to the body of the vehicle, each of said trunks including a sprocket wheel and a ribbed globular wheel with parallel axles, both connected by a convenient transmission, the common plane of said two wheels being diversely orientated in the two trunks.

6. In an odograph as specified in claim 1, with a differential gear and a speed changing device interposed between the driving wheels and the writing point, the speed changing device comprising two rotatable trunks, each including a sprocket wheel and a ribbed globular wheel, providing a sprocket wheel driven through a convenient transmission by the corresponding half axle of the differential gear, and meshing with the globular ribbed wheel of one of the trunks, and a globular ribbed wheel connected by means of an appropriate transmission with one of the sliding bars of the writing point, and meshing with the sprocket wheel of the same trunk.

In witness whereof I have signed my name to this specification at Rome, this 20th day of April, 1927.

LUIGI KAMBO.